(No Model.)
G. CROUCH.
TRUNK CASTER.
No. 518,094. Patented Apr. 10, 1894.
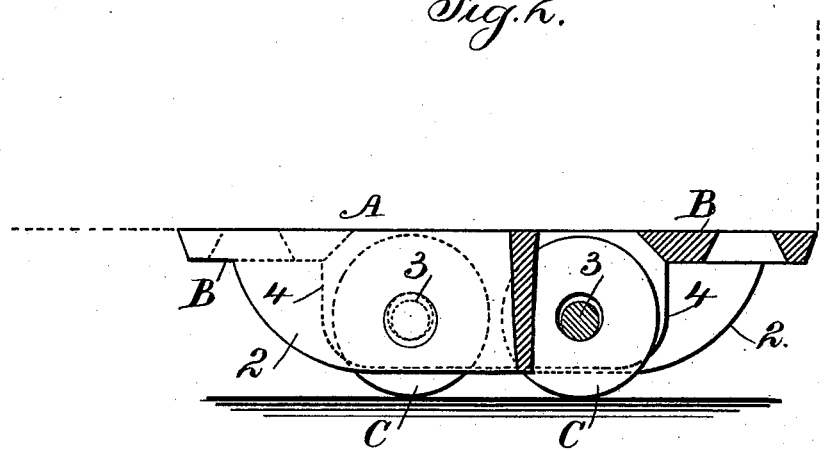
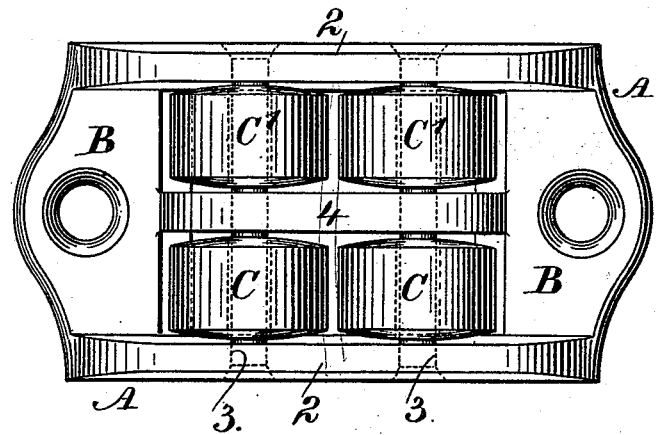
Witnesses
Chas. H. Smith
J. Staib
Inventor
George Crouch
per Lemuel W. Serrell
Atty.

UNITED STATES PATENT OFFICE.

GEORGE CROUCH, OF NEW YORK, N. Y.

TRUNK-CASTER.

SPECIFICATION forming part of Letters Patent No. 518,094, dated April 10, 1894.

Application filed February 13, 1893. Serial No. 462,025. (No model.)

*To all whom it may concern:*

Be it known that I, GEORGE CROUCH, a citizen of the United States, residing in the city and State of New York, have invented an Improvement in Trunk-Rollers, of which the following is a specification.

Traveling trunks have heretofore been provided with small rollers introduced within metal frames at the angles of the bottom, and heretofore there has only been one roller in each frame and either the axis of the roller has had to be large in order to be sufficiently strong to withstand the weight and concussion to which such rollers are subjected, and the friction upon the axis or pin has been so great as to prevent the roller turning freely or else the axle pin has been liable to become bent.

My present improvement is made with reference to the distribution of the weight of the trunk in such a manner that each roller will take only a small portion of the weight and hence the axes of the rollers can be comparatively small and the rollers will turn freely especially when the trunk is being rolled upon a level surface.

In the drawings, Figure 1 is an inverted plan view of the trunk rollers, and Fig. 2 is a side view partially in section representing the rollers in magnified size.

The frame A is quadrangular and provided with end flanges B for the reception of attaching screws or rivets, and the side flanges 2 of the frame A receive between them the rollers C C' upon the axes or pivots 3 which are in the form of wires passing through the flanges 2 and riveted or otherwise fastened at their ends. These axes 3 are parallel to each other and the rollers are also parallel, so that the weight is distributed upon the rollers and each axis has to support less weight and hence can be smaller than would be necessary if only one roller was made use of.

I prefer to employ the central rib or flange 4 in the frame A through which central rib the axes 3 also pass, and thereby said axes are supported more reliably and the rollers can be shorter so as to introduce four of said rollers within the frame, thus dividing up the weight and lessening the risk of the axes of the rollers bending under the weight to which they are subjected while in use.

The flanges 2 extend beyond the rollers in such a way as to lessen the risk of injury to the rollers by lateral concussion in cases where a trunk is dropped upon one corner thereof, thus preventing the wires forming the axes of the rollers from becoming bent.

This improved trunk roller is a new article of manufacture that is much more durable than the trunk rollers heretofore made and it is better adapted to the ordinary circumstances of use, because the rollers will revolve with less friction than has heretofore been inseparable from trunk rollers.

I claim as my invention—

A trunk roller formed of a frame with side flanges 2 and a central flange 4 with cross axes passing through the respective flanges and four rollers, two on each of the cross axes and between the respective flanges, substantially as set forth.

Signed by me this 9th day of February, 1893.

GEO. CROUCH.

Witnesses:
GEO. T. PINCKNEY,
A. M. OLIVER.